(12) United States Patent
Schenk et al.

(10) Patent No.: US 7,301,690 B2
(45) Date of Patent: Nov. 27, 2007

(54) MICRO-OPTICAL ARRANGEMENT

(75) Inventors: Harald Schenk, Dresden (DE);
Christian Drabe, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 11/410,313

(22) Filed: Apr. 25, 2006

(65) Prior Publication Data

US 2006/0250708 A1    Nov. 9, 2006

(30) Foreign Application Priority Data

Apr. 25, 2005  (EP) ................... 05008998

(51) Int. Cl.
  G02B 26/00 (2006.01)
  G02B 5/08 (2006.01)
  G02B 17/00 (2006.01)
  H04R 17/00 (2006.01)
  G11B 7/00 (2006.01)

(52) U.S. Cl. ............. 359/290; 359/292; 359/198; 359/846; 359/871; 359/726; 367/160; 250/234; 310/330; 310/331; 369/43

(58) Field of Classification Search ............. 359/846, 359/847, 871, 872, 578, 213, 223, 224, 230, 359/290–292, 197, 198, 724, 726, 727, 298; 250/234, 235; 235/462.37; 310/330, 331; 369/43, 100, 110, 119, 126, 137, 139, 144; 367/160; 347/20, 40, 54
See application file for complete search history.

(56) References Cited

U.S. PATENT DOCUMENTS 4,366,563 A * 12/1982 Riddle .................. 369/43
5,099,461 A * 3/1992 Fitzgerald ................ 367/160
5,742,419 A 4/1998 Dickensheets et al. ...... 359/201
5,862,003 A 1/1999 Saif et al. .................. 359/871
5,880,896 A 3/1999 Ishii et al. .................. 359/846
2003/0169516 A1 9/2003 Sekiyama .................. 359/726
2003/0214734 A1 11/2003 Nishioka et al. ............ 359/846

FOREIGN PATENT DOCUMENTS

FR          2733327      10/1996
WO     WO 2004/113990   12/2004

* cited by examiner

Primary Examiner—Loha Ben
(74) Attorney, Agent, or Firm—Jacobson Holman PLLC

(57) ABSTRACT

The invention relates to a micro-optical arrangement with which in particular optical properties of an optical element or its influencing of electromagnetic radiation may be changed. Thereby the optical elements with a reflecting surface are preferred. It is the object of the invention to provide for a changeability of optical parameters, in particular of the focal width with small time constants, in an inexpensive manner and with a small required constructional volume. The micro-optical arrangement according to the invention comprises a plate-like optical element onto which electromagnetic radiation is directed on an optically effective surface. The optical element thereby is fixed or clamped at least at one outer edge point. The optical element is elastically deformed due to mass inertia as a result of a translatory movement at least approximately parallel to the optical axis between two reversal points ($-z_0$, $z_0$).

14 Claims, 4 Drawing Sheets

MICRO-OPTICAL ARRANGEMENT

Figure 1:
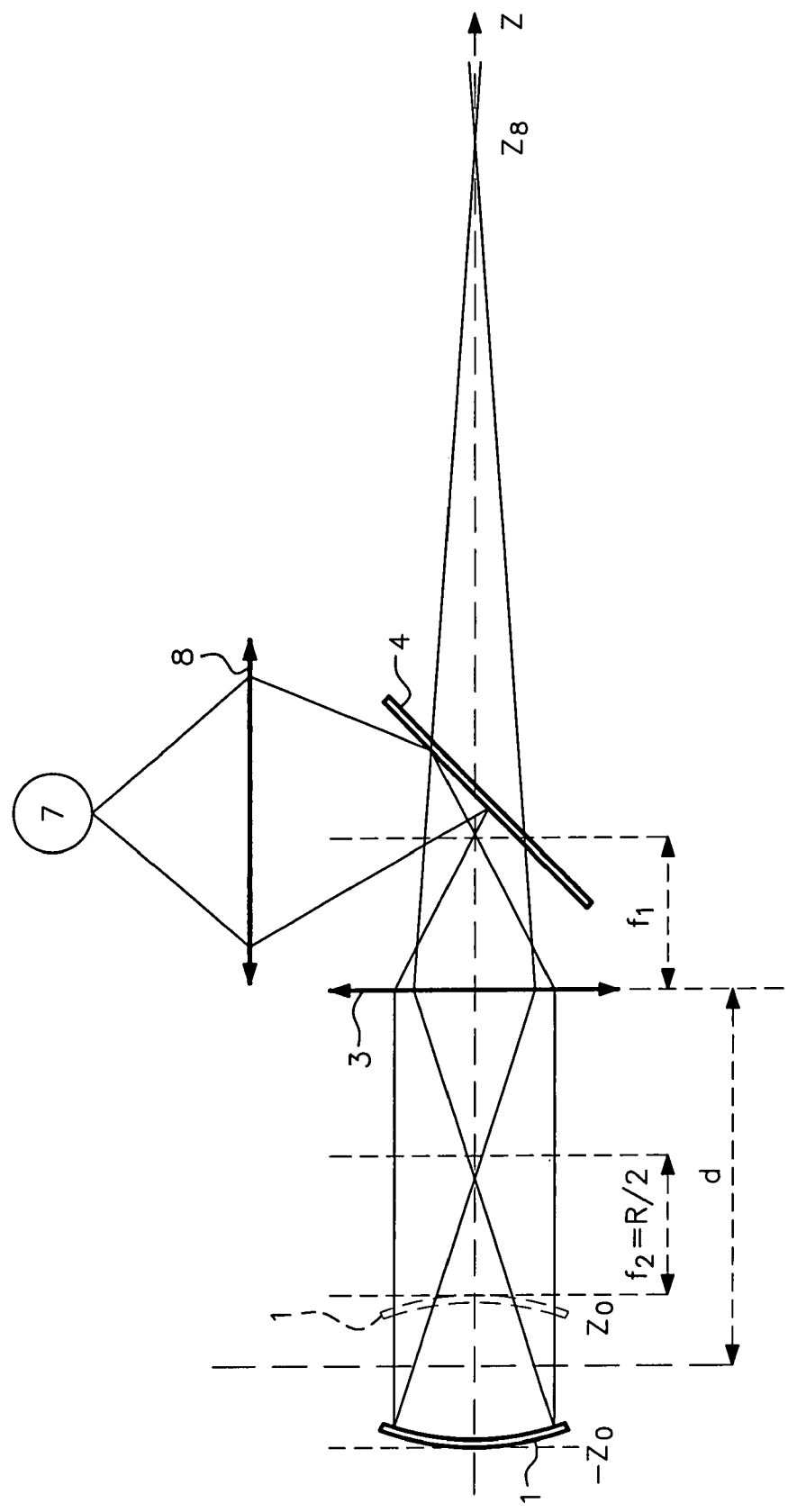

The invention relates to a micro-optical arrangement with which in particular optical properties of an optical element or its influence on electromagnetic radiation may be changed. Such an optical element may preferably comprise a reflecting surface, and thereby the respective focal width may be varied in certain settable limits, also in combination with further optical elements. The optical elements applied on a micro-optical arrangement according to the invention are thereby dimensioned in a region of up to a few millimeters with respect to their external dimensions, wherein 20 mm would represent the upper limit.

For micro-optical arrangements too, there often exists the requirement of the variation of the focal widths or also other optical parameters, which as a rule may either be realised by a complicated optical construction or with an increased time constant.

The confocal measurement principle is applied for detecting the surface topologies of objects. Thereby, the focal point position with respect to the surface (Z-direction) is varied. Usually, one proceeds such that the optical path from the respective light source (e.g. point light source) to the respective object is changed. The position of the focal point is influenced on account of focussing and, as the case may be, also collimating optical elements in the beam path. In another alternative, the object to be examined may be moved solely or additionally, and accordingly a change in the distance may be effected, so that the respective focal point position may be adapted.

On reading out bar codes, one must take into account the fact that the respective position of the focal point determines the position at which the respective bar code may be detected with the greatest density. The larger is this distance between the bar code and the focal point, the lower however becomes the resolution capability of the scanner applied for this. The performance and the resolution capacity of the scanner however are limited.

Two ideas for solving this are known for cases in which a corresponding distance change of the respective object/bar code is not possible or is not desirable.

In a first alternative, one may achieve an extension of the optical path length between the respective light source with an additional optical element, specifically a planar mirror, which is moved perpendicularly to the incident light or also other electromagnetic radiation, also in the visible wavelength region of the light. A suitable drive is necessary for the movement of such a mirror, which for example may be based on an electromagnetic principle. However, here the disadvantages are that a micro-optical construction in particular entails a high manufacturing effort with correspondingly high costs, and furthermore that the miniaturisation is reduced on account of the required constructional volume. These mirrors manufactured with a minimum size in conventional precision mechanics technology also have high intrinsic masses.

Such a solution is not suitable, in particular for mobile applications as for example is the case with manually handled scanners. Such a movement of the mirror also demands an increased time, so that the time constant is accordingly increased. Thereby, a limitation of the possible changeability of the optical path length results, whilst taking into account the desired miniaturisation effect.

In a second alternative, one may also apply deformable, optical, reflecting elements (mirrors). Thereby, the deformation may lead to a changeable focal width of a concave mirror. The deformation of such reflecting, optical elements is usually realised with actuators which are arranged below the reflecting, optical element. Such adaptive-optical systems are usually deformed by way of piezo-actuators.

The cost aspect and the required volumes also have a disadvantageous effect with these solutions.

Smaller volumes and reduced costs may be achieved with micro-mechanically manufactured, deformable, reflecting optical elements. Thereby, the deformation is achieved statically or quasi statically by way of an electrostatic effect. Thereby, several such elements are often applied as arrays of individual, translatorily and, as the case may be, rotationally adjustable, reflecting optical elements or also membrane mirrors, as is known from S. Cornellison et al in "MEMS spatial light modulators with integrated electronics"; MOEMS and Miniaturized Systems II; Proc. SPIE. Vol. 4561 (2001); pages 28-34. Thereby, membrane mirrors consist of a continuous mirror membrane which are deformed by actuators arranged below a membrane. A segmenting of the reflecting surface or of actuators permits different deformation profiles. It however also has the disadvantage that the beam quality reduces on account of the higher spatial frequencies in the reflecting surface. The activation requires some effort, since each actuator must be activated independently, and a high number of actuators is necessary in order to achieve the respective deformation profile to a good approximation.

It is therefore the object of the invention to provide a micro-optical arrangement with which a changeability of optical parameters, in particular the focal width, may be provided with a low time constant, inexpensively and with a small required constructional volume.

With regard to the invention, one utilises the fact that an elastic deformation of an optical element as a result of its mass inertia with an acceleration with an accompanying translatory movement, has an effect on the respective optical element. Such an optical element thereby is held or clamped in a fixed manner on at least one outer edge point, preferably on at least two edge points.

If then, such a held or clamped optical element is moved to and fro between two reversal points in a translatory manner at least approximately parallel to its optical axis, alternating accelerations with an alternating direction act on the optical element, so that a suitably shaped and dimensioned optical element may elastically deform as a result of its intrinsic mass inertia. Thereby, the translatory movement may be effected exactly parallel to the optical axis or, as the case may be, with an angular deviation of up to ±25° to this. Accordingly, also at least one optically effective surface present on an optical element deforms such that a change in the incidence angles of electromagnetic beams onto such a deformed optical active surface also occurs. This then for example leads to the fact that a suitable variation of the focal width for electromagnetic radiation reflected by the optically effective surface may be achieved. The elastic deformation, depending on the movement direction of the translatory movement, leads to a concave or convex curvature of the optically effective surface, wherein with a zero crossing, thus in the middle between the two respective reversal points of the translatory movement, no acceleration acts on this optical element, so that no deformation may be experienced in this region of the movement, and in the case that the optically effective surface of the optical element is a planar, level surface, this in the region of the zero crossing forms a surface directed perpendicular to the optical axis.

Then, depending on the alignment of the optically effective surface and the respective translatory movement direction, one may have a maximal concave or convex curvature of the optical surface.

The translatory movement may be carried out at a constant frequency.

A correspondingly, elastically deformable optical element may for example be designed in the form of a thin plate with different outer contours which quasi forms a planar-parallel plate in the non-deformed condition. Thereby, whilst taking into account the intrinsic mass of the optical element, the thickness may be selected such that the mass inertia with the acceleration acting on the optical element, leads to a utilisable elastic deformation.

The optical element may be fixed or clamped by way of a frame, wherein the frame and optical element is likewise moved to and from in a translatory manner between the reversal points.

In the simplest case, such an optical element may be held or clamped in a fixed manner on in each case two sides lying exactly opposite one another, so that different geometries may be utilised for a correspondingly deformed, optically effective surface.

Thus for example an optical element with a rectangular or square outer contour may be held or clamped in a fixed manner at end-sides which in each case are arranged lying opposite one another. In this case, one may achieve a variation of a line focus by way of the elastic deformation.

With optical elements with a circular or elliptical outer contour, the clamping may be effected over the whole periphery in a frame, or with bearings or joints which are arranged over the periphery, preferably in an equidistant manner.

Thereby, such a frame or element acting in an equivalent manner should have a high strength and stiffness, which does not lead to any deformation or only leads to a negligible deformation given the acting accelerations.

An almost spherical elastic deformation of the optically effective surface onto which the respective electromagnetic radiation, for example light, is incident, may be achieved by way of this.

With the translatory to and fro movement between the reversal points $-z_0$ and $+z_0$, a zero crossing "0" is effected in the middle. Thus a radius of curvature $-R$ and a focal width $-R/2$ may be achieved at the reversal point $-z_0$, and a radius of curvature $+R$ and a focal width $+R/2$ may be achieved at the respective other reversal point $+z_0$. At the zero crossing, the radius of curvature and the focal width lie at infinity when the optical effective surface of the optical element is designed as a level, planar surface which is directed perpendicular to the optical axis.

Thus, a useful utilisation in a region in the vicinity of, or directly at the reversal points is very easily possible without additional measures.

This may however be accomplished or improved by way of the application of additional optical elements which are arranged in the beam path between a light source, preferably a point—or line light source.

Thus, a further optical lens with a constant focal width may be arranged in the beam path between the light source and the optical element, and radiation incident onto an optically effective surface of the optical element is directed onto this, on account of this focal width. Electromagnetic radiation which is reflected back by the optically effective surface may be further beamed in via this optical lens with the constant focal width, and the corresponding image may be directed for example onto one or more optical detectors.

The electromagnetic radiation coming from a light source, on its own or additionally, may also be directed onto the optically effective surface via a reflecting optical element, and thereby be deflected. For this, preferably an optical beam splitter may be suitably arranged and aligned.

A micro-optical arrangement with the elastically deformable optical element and an optical lens may be described by way of the simple focal width equation of a lens pair. The optical lens with a constant focal width collimates the electromagnetic radiation parallel to the optical axis onto the optically effective surface of the elastically deformable optical element, and this is focussed by this optically effective surface again onto the optical lens with a focal width corresponding to the respective elastic deformation. This focal width is dependent on the respective position of the optical element between the two reversal points $+z_0$ and $-z_0$ and the respective focal width may be deduced with the equation:

$$\frac{1}{f} = \frac{1}{f_l} + \frac{1}{f_s} - \frac{d-z}{f_l f_s}.$$

Thereby, $f_l$ is the constant focal width of the optical lens, $f_s$ is the variable focal width of the elastically deformable optical element at the optically effective surface, d the distance between the middle of the optical lens and the zero crossing of the optical element, thus at $z=0$, and $z$ the respective position of the optical element. The amplitude $z_0$ of the translatory movement of the optical element should always be assumed as a positive value hereinafter.

From this, a total focal width of an arrangement, consisting of an elastically deformable optical element and an additional optical lens results, with an assumption of $z_0=0.1$ mm, $d=1.0$ mm, $R=150$ mm and $f_l=50$ mm. The values for a z-position of the focal point $z_B$ may be deduced from the subsequent table whilst taking into account the computational equations specified therein.

| Position z of the deformable mirror | focal width of the pair | z-position of the focal point $z_B$ | number values for $z_B$ from Example 1 |
|---|---|---|---|
| $-z_0$ | $\frac{1}{f} = \frac{1}{f_l} - \frac{2}{R} + \frac{2(d+z_0)}{f_l R}$ | $z_B = f + d$ | 145 mm |
| 0 | $f = f_l$ | $z_B = f_l + d$ | 51 mm |
| $+z_0$ | $\frac{1}{f} = \frac{1}{f_l} - \frac{2}{R} + \frac{2(d-z_0)}{f_l R}$ | $z_B = f + d$ | 31 mm |

It results from this that with such an example, the position of the focal width $z_B$ may be changed by 114 mm.

The translatory movement which, whilst utilising the mass inertia, leads to an elastic deformation of the optical element, may be initiated magnetically, electro-magnetically, electrostatically, magnetostrictively and/or piezoelectrically. Thus suitable actuators, magnets, electromagnets or electrodes may be arranged such that by way of a suitable influencing, the respective optical element, as the case may be, also with the frame or corresponding equivalently acting means, is moved to and fro in a translatory manner between the two reversal points. Thus for example at least one suitable actuator may engage directly on the frame, and transmit a corresponding movement. Magnets, electromagnets or also electrodes may be suitably arranged and controlled, wherein in the case of magnets with a settable frequency, magnetic short circuits lead to the translatory to and fro movement, and one may operate with electromagnets as well as electrodes with an alternating potential difference.

However, flexures may also be formed on an elastically deformable element which may be applied on a micro-optical arrangement according to the invention. This is possible by way of point-like or groove-like recesses and/or gaps on/in the optical element.

Thus recesses may be advantageously formed on the surface of the optical element lying opposite the optically effective surface.

Flexures may however also be manufactured by way of gaps which are formed in the optical element, wherein this is possible via a suitable arrangement of several such gaps. The arrangement of such gaps may be selected whilst taking into account the geometric shaping of the outer edge contour of the optical element, and thereby closed webs should be present between the respective gaps.

In this case, an elastically deformable reflecting film or membrane may be deposited or fastened thereto on an optically effective surface of the optical element.

Apart from the possibility of the influencing of the elastic deformation of the optical element by way of flexures, the possibility however also exists of providing for an influencing of the surface topology on an optical element. Thus the surface arranged lying opposite the optically effective surface may be designed in a structured and/or curved manner, which leads to a suitable stiffness distribution and/or mass distribution on the respective optical element, with which an influence on the elastic deformation of the optical element caused by acceleration may be formed by way of the corresponding inertias.

The elastically deformable optical element may however also be fixed or clamped not directly on the frame. For this, spring elements or spring damping elements, via which the fixation of the elastically deformable optical element in the frame may be achieved, may be arranged between an outer edge region of the elastically deformable optical element and the frame. Thus a spring-mass system may be formed.

Apart from the already mentioned variation possibility of the focal width or also divergence of electromagnetic radiation reflected by the active surface of the elastically deformable element, the possibility of a beam formation is also to be provided, which in particular concerns a targeted influencing of the geometry of the cross section of the reflected beam of electromagnetic radiation.

Figure 2:
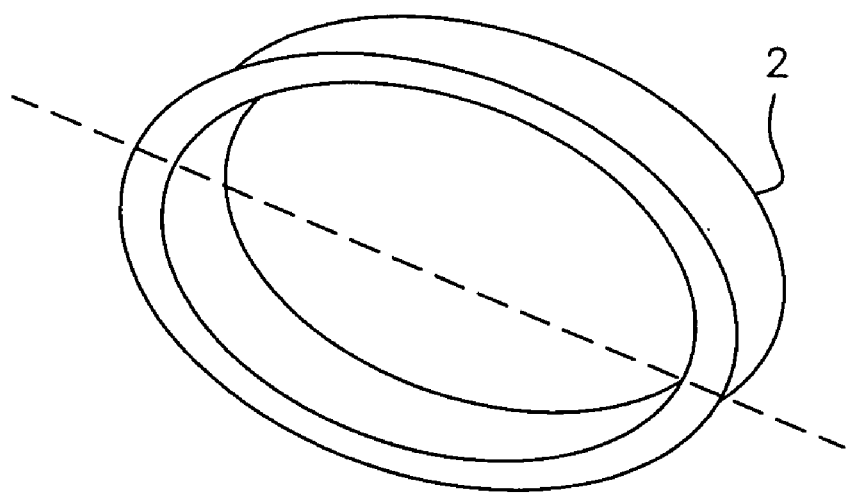
Figure 7:
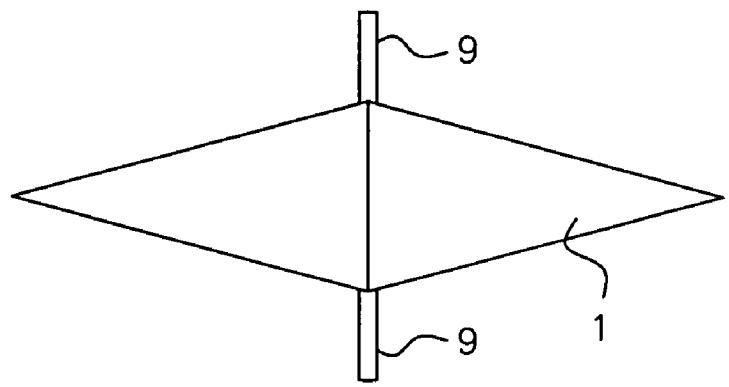
Figure 8:
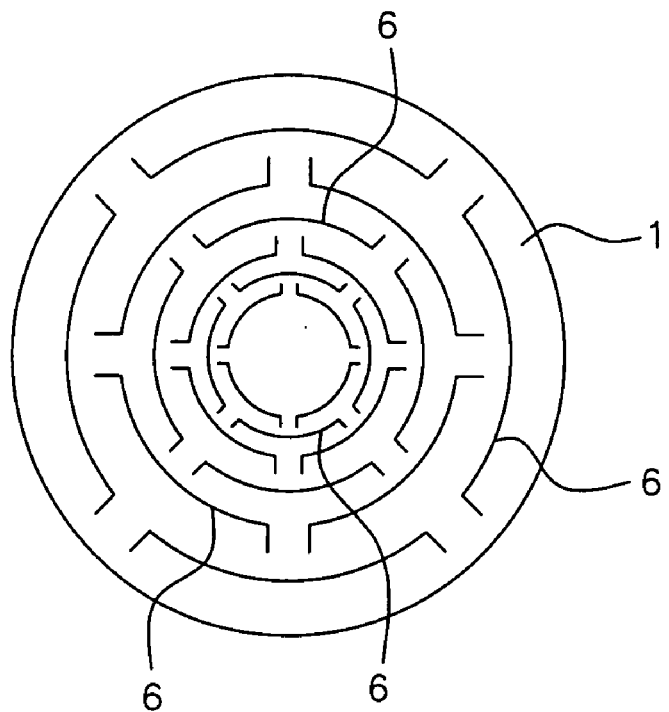

The invention is described hereinafter in more detail in the drawings. There are shown in:

FIG. 1 a schematic representation of an example of a micro-optical arrangement according to the invention, with an elastically deformable element and further optical elements;

FIG. 2 a perspective representation of an elastically deformable optical element, which is fixed with its outer edge in a frame;

FIGS. 3 to 6 in a schematic representation, deformations of an elastically deformable element with different accelerations acting on this;

FIG. 7 an example with which an elastically deformable optical element is mounted by way of a pair of triangle springs, and FIG. 8 an example of an elastically deformable element, which is elastically deformable with a settable deformation profile by way of segmentation.

One example of a micro-optical arrangement with several optical elements, as has already been indicated in the general part of the description, is shown in FIG. 1 in a schematic form.

Thereby, electromagnetic radiation is emitted by a point light source 7. This is directed onto a beam splitter 4 which is inclined by 45 degrees with respect to the optical axis by way of an optical lens 8, and from there, via an optical lens 3 with a constant focal width, is directed in a collimated form onto an optically effective surface of an elastically deformable, optical element 1.

The elastically deformable optical element 1 is represented in FIG. 1 at the reversal points $-z_0$ and $z_0$ of a translatory movement to and fro parallel to the optical axis of the elastically deformable optical element 1, with the respective deformation.

As a result of the acting acceleration and the mass inertia of the elastically deformable optical element 1, one may achieve a concave curvature of the optically effective, here reflecting surface of the elastically deformable element 1 at the reversal point $-z_0$, so that a focussing of the reflected electromagnetic radiation is achieved with a focal width $f_s$ corresponding to the deformation with a radius of R/2. A renewed focussing is effected with the optical lens 3, so that an increase in the total focal width may be achieved and thus the z-position of the focal point $Z_B$ at an increased distance results.

Possibilities for other positions for the focal point with the zero crossing and $Z_0$ may be deduced from Table 1 of the general description.

Thus, an enlarged region results, with which a corresponding micro-optical arrangement with a sufficiently high resolution capability may be utilised at different distances of objects.

An elastically deformable, optical element 1 with a circular outer contour and which is mounted in a frame 2 with a significantly increased strength and stiffness, in particular on taking into account the vectors of the translatory movement to and fro, is represented in FIG. 2 in a perspective representation.

The representations of FIGS. 3 to 6 are cross sections along the dashed line of FIG. 2.

Figure 3:
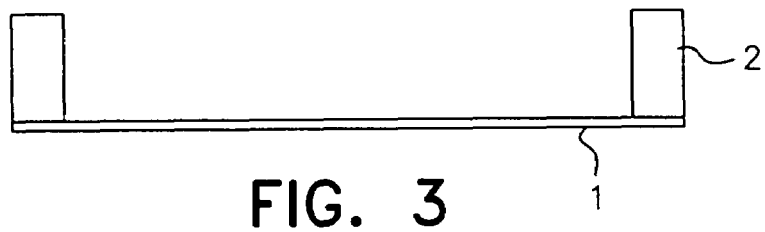
Figure 4:
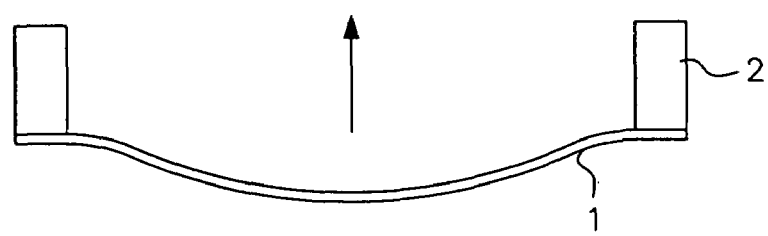
Figure 5:
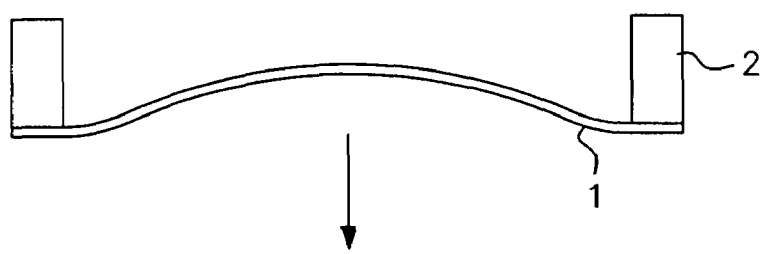
Figure 6:
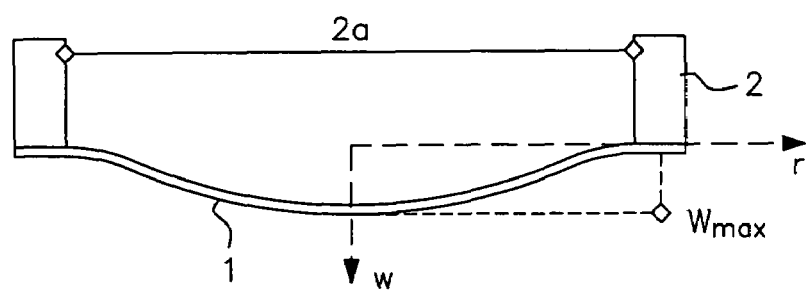

The elastically deformable optical element 1 is represented in FIG. 3 with an acceleration of 0, as is also effected at the zero crossing. FIGS. 4 to 6 show elastic deformations due to the convex and concave curvature of the elastically deformable element 1, as may occur with the largest radius R/2 at the two reversal points $-z_0$ and $z_0$.

The elastically deformable element 1 may for example be a plane-parallel plate which has a reflecting surface at least on one side. It may for example be manufactured of silicon, silicon nitride, $SiO_2$, $MgF_2$ or also of a glass and, as the case may be, also be provided with a reflecting coating.

An elastically deformable, optical element 1 which is clamped into a frame at the edge, and with a constant surface load, may be computed according to the following equation:

$$w(r) = w_{max}\left(1 - \frac{r^2}{a^2}\right)^2.$$

$w_{max}$ thereby indicates the maximal deflection of the elastically deformable, optical element 1 which occurs at r=0. It is determined by way of the extension of the elastically deformable element 1 with regard to the surface, its stiffness and its surface load.

The elastic deformation must be spherical in order to function as a concavely or convexly curved reflecting, optical element.

A purely spherical elastic deformation with the radius R may be described as follows:

$$w_{sph}(r) = R\sqrt{1 - \frac{r^2}{R^2}} - R + w_{max}.$$

A deviation $\Delta w$ from the spherical shape may be expressed according to the Taylor expansion of the spherical deformation and whilst neglecting all terms of r from 6th power, as follows:

$$\Delta w = -2w_{max}\left(\frac{r}{a}\right)^2 + \frac{R}{2}\left(\frac{r}{R}\right)^2 + w_{max}\left(\frac{r}{a}\right)^4 + \frac{R}{8}\left(\frac{r}{R}\right)^4.$$

The quadratic r-terms may be neglected under the condition $$R = \frac{a^2}{4w_{max}}.$$

Thus the radius of the approximately spherical part of the elastically deformed optical element 1 may be defined. From the condition $\Delta w < \lambda/n$, for a defined wavelength $\lambda$, one may estimate the region of the elastically deform able element 1 in which the approximation is quite well suitable from an optical point of view. Thereby, n typically has a value of 10 or 20.

The maximal utilisable radius results from this and with the aid of the determined equation of R:

$$r_{max} = \left(\frac{\lambda}{n\left(\frac{w_{max}}{a^4} + \frac{8w_{max}^3}{a^6}\right)}\right)^{1/4}.$$

For example, with a value of
a=2.0 mm
$w_{max}$=0.05 mm
=>R=20 mm
$\lambda$=633 nm
n=10
$r_{max}$=0.38 mm the focal widths f may vary in the intervals [$-\infty$; $-10$ mm] and [10 mm; $\infty$]. Thereby, a circular region of the active surface of an elastically deformable element 1 with a diameter of 0.7 mm may be utilised.

A quadratic dependency of the elastic deformation on r results with a small r. Such a configuration may however also be applied to an elastically deformable optical element 1 designed with a parabolic shape.

If the clamping of an elastically deformable, optical element 1 is not effected in a fixed manner at the edge, but e.g. by way of suitable springs, the deformation of the elastically deformable optical element 1 at the location of the clamping becomes larger than zero, and a change in the polarity of the second derivation of w(r) no longer takes place between the clamping and the middle of the elastically deformable, optical element. The optical utilisable region of the optically effective surface of the elastically deformable element 1 may be increased by way of this.

The previously specified explanations and equations relate to an optical element 1 with a constant thickness. By way of a variation of the thickness, one may also influence the nature of the elastic deformation, since on the one hand the surface loading on acceleration is no longer constant, and on the other hand the local stiffness of the elastically deformable optical element 1 may be adapted accordingly. Thus the elastic deformation may assume almost any course, for example the utilisable region of the optically effective surface of the elastically deformable element 1 may be increased in the case of a spherical deformation. A corresponding topology, in particular of the surface which lies opposite the optically effective surface of the elastically deformable element 1 and which may not be optically used, may be formed by a known precision mechanical method or micro-mechanical method. This however is also possible by way of a manufacture by way of injection moulding, a suitable laser structuring or similar methods.

A further example of an elastically deformable optical method 1 is shown in FIG. 7.

Thereby, two triangle springs are arranged mirror-symmetrically to one another, with which the elastically deformable optical element 1 may be held clamped at the edge. The triangle springs are suspended in the axis of symmetry by way of two spiral springs 9. The translatory movement may be initiated via these spiral springs 9, so that the corresponding accelerations may have their effect. The translatory movement thereby is effected perpendicular to the plane of the drawing.

Thereby, the bending line of a triangle spring clamped on one side may be observed for reasons of symmetry. Here the following applies:

$$w = w_{max}(r/l)^2.$$

Here, r is the distance to the clamping, and l is the length of the respective triangle spring. The shape, as in the first embodiment example, may again be described as a spherical elastic deformation for small deflection paths. Thereby, a cylindrical concave or convex mirror arises. The utilisable region of the optically effective surface again results from optical considerations. The arrangement represents a cylindrical parabolic mirror for all deflections.

A further example of an elastically deformable optical element 1 is represented in FIG. 8. The mass distribution with an acting acceleration may lead to a changing deformation profile with such an embodiment, and this profile may be influenced within large limits. Thus for example one may generate a spherical elastic deformation. However, other elastic deformations which have higher spatial frequencies are also possible. However, a desired deformation profile, alternatively to a targeted locally differentiated mass distribution, may also be at least approximately achieved by way of subdividing the elastically deformable element 1 into individual segments. The segments are connected by springs or flexures. With an adequately high number of segments and a smaller gap width between the segments, one may neglect the optical disturbance caused by the segmentation. The gaps 6 drawn in FIG. 8 with black lines separate the individual segments from one another.

With an example according to FIG. 8, a thin reflecting membrane may be deposited onto an optically effective surface of a deformable optical element 1 designed in such a manner, which may lead to an optical filling factor of 100%.

The invention claimed is:

1. A micro-optical arrangement comprising a plate-like optical element onto which electromagnetic radiation is directable on an optically effective surface;
   clamping means for clamping or fixing said optical element on at least one outer edge point of said optical element, and
   said optical element elastically deformable due to mass inertia with a translatory movement at least approximately parallel to an optical axis of said optical element between two extreme points defining reversal points ($-z_0$, $z_0$) where the optical element reverses its direction of translatory movement.

2. An arrangement according to claim 1, characterised in that flexures are formed on the optical element.

3. An arrangement according to claim 2, characterised in that said flexures are formed by way of point-like or groove-like recesses and/or gaps on/in the optical element.

4. An arrangement according to claim 1, characterised in that said clamping means comprises two triangle springs.

5. An arrangement according to claim 1, characterised in that the translatory movement may be initiated magnetically, electromagnetically, electrostatically, magnetostrictively and/or piezoelectrically.

6. An arrangement according to claim 5, characterised in that said clamping means comprises a frame and further comprises at least one actuator engaging said frame.

7. An arrangement according to claim 1, characterised in that said optical element has a surface arranged opposite said optically effective surface, said surface formed structured and/or curved.

8. An arrangement according to claim 1, characterised in that electromagnetic radiation is directed onto the optically effective surface of the optical element via at least one further optical element.

9. An arrangement according to claim 8, characterised in that the further optical element is an optical lens with a constant focal width.

10. An arrangement according to claim 9, characterised in that the focal width may be changed as a result of the elastic deformation of the optical element.

11. An arrangement according to claim 1, characterised in that electromagnetic radiation is directed onto the optically effective surface of the optical element by way of a beam splitter.

12. An arrangement according to claim 1, characterised in that the optically effective surface of the optical element, at least at one reversal point of the translatory movement, is deformed concavely, and at the respective other reversal point, is deformed convexly.

13. The arrangement of claim 1 wherein said clamping means comprises a frame.

14. An arrangement according to claim 13 characterised in that spring elements or spring damping elements are arranged between the frame and the outer edge region of an elastically deformable optical element.

* * * * *